United States Patent Office 3,514,412
Patented May 26, 1970

---

3,514,412
PROCESS FOR PREPARING URANIA-PLUTONIA NUCLEAR FUEL
Leonard V. Triggiani, Silver Spring, and Moises G. Sanchez, Severna Park, Md., assignors to W. R. Grace & Co., New York, N.Y., a corporation of Connecticut
No Drawing. Filed Sept. 25, 1967, Ser. No. 670,394
Int. Cl. C09k 3/00
U.S. Cl. 252—301.1
10 Claims

ABSTRACT OF THE DISCLOSURE

A process for preparing microspheres of urania-plutonia. The microspheres are prepared by impregnating a matrix of urania with a solution containing plutonia. The adsorbed plutonium is precipitated within the urania pores with a suitable material. The impregnated microspheres are then washed, dried and sintered to recover mixed oxide microspheres.

---

The preparation of fuel elements from sols has resulted in products that have very desirable physical properties. The products can be sintered to very high density at much lower temperatures than was possible when the fuel elements were prepared by conventional ceramic techniques. Microspheres prepared from sols may range in size from a few microns up to 1000 microns or more and provide a very convenient method of handling nuclear fuels.

There has been demand for fuel elements of binary and multi-component structure containing more than one material. Plutonia-urania fuels, for example, are in demand as are the thoria and urania fuels containing fissionable materials such as U–235 or U–233.

In the prior art processes these compositions have been prepared by co-precipitation from solutions of salts of the respective metals or by physical mixing of the dried oxide particle, followed by comminution, pressing, etc., by means of conventional ceramic techniques. They have also been prepared from mixed oxide sols in a process wherein a solution or sol of the second component is added to a sol of the first component.

The differences in the level of the radio-toxicity of the fertile matrix component and the fissionable second component increases the problems in preparing mixed oxide sol products by these conventional techniques. Urania (U–238) can be handled safely with conventional laboratory equipment. Plutonium, on the other hand, can only be handled in glove boxes and other sophisticated equipment. The handling problems are multiplied several fold when the mixed oxide fuel preparation is scaled up for plant production.

We have developed a process for preparing these mixed fuel systems in which the two components are handled separately in equipment designed to handle each component. This system is a substantial improvement over the conventional processing in which both the components are processed together in each of the steps, so that the most sophisticated equipment is necessary for each step and for the entire quantity of material being processed.

In our novel process, we impregnated porous matrix particles with oxide precursors of the fissionable component. This may be accomplished by impregnating the spheres with sols or a solution of a salt of the desired fissionable component followed by conversion to the oxide in the pores of the matrix. The particles can also be impregnated with the additive in gaseous form ($PuF_6$, $UF_6$, etc.) followed by precipitation in the pores and conversion to the oxides.

The particles may be subjected to various degrees of drying. The spheres may properly be termed gels in microspheroidal form. The term "gel" is thus applicable to describe our matrix materials.

Our process fills a long standing need for means of preparing a mixed oxide fuel wherein the fissionable oxide component is isolated to only a few process steps, so that the greatest amount of work can be done in conventional equipment. This system also avoids the problem of contamination of the equipment with the fissionable materials prior to the final step of the process.

For purposes of simplicity our process will be described as our preferred microsphere impregnation process. However, it is obvious that our process can be used for preparing nuclear fuel particles in any desired shape or physical form.

In our preferred process, we prepare the fertile matrix microspheres (thoria or urania) and add the desired amount of the fissionable component as a solution of a salt or as a sol of the component. The impregnated microspheres are then washed, dried and calcined to prepare the final product.

Broadly speaking, our preferred process comprises the following steps:

(1) Selection and dissolution of the fuel raw materials.

(2) Preparation of sols or suitably modified solutions of these materials.

(3) Formation of microspheres from the sols or the suitably modified solutions.

(4) Addition of a fissionable additive into the microsphere product.

(5) Washing, drying and sintering the microspheres containing the additive.

In the first step of our process, the materials to be used as the fertile base material and the fissionable material are selected. The principal matrix materials are natural, reprocessed or depleted urania (U–238) alone, or in admixture with other materials such as thoria, for example. Thoria (Th–232) may also be used as a fertile matrix material. The fissionable second component of the microspheres may be urania or plutonia, for example. Urania (U–238), for example, may be impregnated with plutonia or the fissionable isotopes U–233 or U–235. A mixed thoria-urania fuel may be prepared by impregnating thoria microspheres with U–233 or U–235.

The fertile matrix material, urania or thoria, is first obtained as a solution of nitrate, chloride, etc. The solution is then converted to the sol form. Suitable sols may be prepared by any of several methods. The preferred techniques for sol formation are:

(1) Electrodialysis using anion permeable membranes.
(2) Controlled hydrolysis with urea.
(3) Ion exchange using resin in the hydroxide form.
(4) Peptization of washed hydroxides with an acid.
(5) Electrolysis of solutions, with oxidation of the anions to a volatile component.

In the next step of our process, the sols are converted to microspheres. The method of preparing these microspheres is not part of this invention. It is covered in co-pending application Ser. No. 541,519, filed Apr. 11, 1966, now U.S. Pat. 3,331,785. Briefly, the process comprises forming the sols into droplets and drying the droplets in a column of solvent passed in countercurrent direction to the sol particles. The formed microspheres are removed from the bottom of the column and washed.

The matrix material may also be prepared as a powder or as microspheres or as larger sized spheroids in a process in which a solution of a salt of the matrix material is admixed with a water soluble resin that increases in viscosity in an alkaline medium. The droplets of solution are fed into an aqueous alkaline solution to form microspheres or spheroids. The particles or spheroids are recovered, washed and dried.

The microspheres or particles may also be prepared by any of the other processes described in the technical and patent literature, provided that the final product has sufficient porosity to retain the desired amount of the fissionable component.

In our process, we believe that the thoria and urania microspheres when contacted with the solution or sol containing the fissionable component accommodates the fissionable component solution within the voids in the microsphere. The solution may then be converted to an insoluble form, dried and sintered.

The solution or sol of the fissionable material used to impregnate the microspheres may be prepared in an inorganic or organic solvent. An aqueous solution of the salt is prferred, since it is thereby possible to achieve a higher concentration of fissionable solution. The preferred salt is the nitrate; however, the chloride, sulfate, etc., can also be used in the preparation of the impregnation solution. The impregnation solution of fissionable material is prepared in concentrations of about 0.1 to 700 grams per liter. When an organic solvent is used, the preferred solvent is acetone. Other suitable solvents include diethyl ether, dibutyl ether, methylisobutylketone, tributylphosphate, trioctylamine, trilaurylamine, cyclohexyldilaurylamine, certain alcohols, etc.

When the fertile base microspheres are uranium dioxide, they may be hyperstoichiometric in oxygen at this stage, due to the presence of hexavalent uranium. Hexavalent uranium is more soluble in aqueous media than quadrivalent uranium. In that case, the microspheres must be reduced to the dioxide if the product is to be free of interparticle sludge, etc. and to insure proper interaction of the impregnant and urania substrate. This reduction can be carried out by using any suitable technique, such as hydrogen reduction, etc. However, this step can be omitted if a non-aqueous solvent is used to prepare the impregnant. The hydrogen treatment is carried out at a temperature of 300 to 900° C. for about 1 hour to about 10 hours. In our process, this step may be completed at low temperatures without destruction of the microsphere structure or porosity.

In one acceptable technique the spheres are impregnated by slowly adding the solution of the fissionable salt or the sol to the microspheres while they are being agitated. When the fertile matrix material is urania, a portion of the agitation is preferably provided by a flow of argon or other inert gas that prevents the oxidation of urania to the hexavalent state. Any suitable inert gas, such as helium, argon, neon, nitrogen, etc., may be used. In the laboratory, it is convenient to agitate the microspheres by regulating the flow of gas in the area surrounding the microspheres. Other mechanical techniques for agitation may be used such as stirring, shaking, etc. Agitation is necessary, however, to permit homogeneous impregnation of the microspheres by the solution or sol of the fissionable component. The amount of the impregnant added to the microspheres is dependent on the final concentration of the fissionable material desired in the product and can be conveniently controlled by adjusting the concentration of the solution. In addition, we may use a second impregnation, if necessary, to introduce more impregnant.

When solutions are used, the microspheres are normally impregnated to incipient wetness. After impregnation, the microspheres are conveniently treated with an organic solvent, such as hexanol, to remove water. It is obvious that other solvents besides hexanol can be used and the choice will be dictated by the solvents used in preparing the solution of the fissionable component.

In yet another acceptable technique, the spheres may be impregnated by total immersion in the medium bearing the impregnant species. Such media may be either gases or liquids such as water, or organic solvents such as acetone, carbon tetrachloride, tributylphosphate, etc.

After any excess water resulting from aqueous impregnation is removed from the microspheres, the fissionable component is precipitated conveniently as the hydroxide in the voids in the microspheres. Obviously the fissionable component can be precipitated as the carbonate, oxalate, etc. A base that will not leave a contaminating residue on the impregnated product, such as gaseous or liquid ammonia, for example, is preferred. The precipitation is generally carried out by slurrying the microspheres in an aqueous ammonia solution. We prefer concentrated aqueous ammonia. However, concentrations of ammonia between 5 and 30 weight percent may be used. Gaseous $NH_3$ has also been used for this purpose. Generally, the precipitation is complete in about 10 minutes. However, shorter or longer times may be dictated by the type of operation and equipment being used.

The microspheres are then washed in deionized water to remove excess ammonia, anions, hexanol or other solvent. Generally about 250 cc. of deionized water per gram microspheres is sufficient to remove all impurities. The microspheres are then vacuum dried.

The sintering step is the final step of our process. Sintering is preferably carried out in a hydrogen-nitrogen atmosphere by heating at 300 to 700° C. for about 0.5 to 7 hours, followed by sintering for another 0.5 to 6 hours at 1000° C. to 1800° C.

The matrix particles may, of course, be separated according to size by screening or other technique and only those particles falling in a given size range impregnated with the fissionable materials.

Our invention is further illustrated by the following specific but non-limiting examples:

EXAMPLE I

Since fissionable materials involve many handling difficulties and are not available for general laboratory investigation, urania microspheres were impregnated with ceria and thoria. Thoria was chosen as an analogue of plutonia because it has a similar crystal structure. Ceria was chosen as a good analogue for the wet chemistry of plutonia.

In this example, the urania microspheres were impregnated with a thorium nitrate solution. The urania microspheres were prepared according to the process described in U.S. Ser. No. 541,519, now U.S. Pat. 3,331,785. The microspheres were pretreated by heating to 500° C. in a hydrogen atmosphere for a period of 3 hours. This treatment converted any hexavalent urania to quadrivalent urania.

The impregnation solution was made up by dissolving 20 grams of thorium nitrate in 15 ml. of water. This solution was added dropwise to the $UO_2$ microspheres. The impregnation was carried out in a dry box in an argon atmosphere. The microspheres were stirred as the impregnation solution was added. A total of about 12.9 cc. of solution was required to bring the 20.2 gram sample of urania microspheres to incipient wetness. The sample was then ammoniated by contacting with 2.5 cc. of 1:5 ammonium hydroxide. The ammonia was removed very gently by decantation. No precipitate was observed in the ammonia filtrate. The spheres at this point were whole and entire with no precipitate on the outside surfaces. To all external appearances there spheres appeared the same as before impregnation.

The impregnated spheres were dried under an infrared lamp for 4 hours. Following this drying, the sample was vacuum dried using the following schedule:

½ hr. at 40° C.
1 hr. at 60° C.
1½ hrs. at 80° C.
1½ hrs. at 100° C.
1½ hrs. at 120° C.

The microspheres were then cooled in a vacuum at room temperature over an 8 hour period at which time the vacuum was broken using nitrogen. The spheres appeared intact. The dried microspheres were then sintered using the following cycle. The temperature was increased to 350° C. in one hour and from 350° C. to 500° C. in two hours and held at 500° C. for one hour. The temperature was then raised to 1400° C. over a 1½ hour period. The temperature was held at 1400° C. for 1½ hours and quenched. The entire cycle was completed in a hydrogen atmosphere.

There was no evidence of inter-particle sludge accumulation and no small particulate crystals appeared on the surface of the microspheres. The sample was analyzed for thorium by an oxalate precipitation method and found to contain 10.51 weight percent thorium. The samples were also analyzed by X-ray diffraction and found to have a single phase pattern. The X-ray diffraction lines were very sharp indicating completeness of solid solution. The unit cell constant $a_0$ was calculated and found to be 5.4851 A. The weight percent solid solution approximated from this unit cell corresponds to 13 weight percent $ThO_2$.

A metallographic mount was prepared of the sample. Examination showed the microspheres to be uniform, fine-grained material in cross section.

An additional sample of the microspheres was mounted in a special resin, ground to expose the cross section and final-polished. This sample was subjected to electron microprobe analysis. The controls of the microprobe instrument were set to correspond to their highest sensitivity for thorium. Tracings were made across several microsphere cross sections. The distribution of thorium was found to be homogeneous and uniform from sphere to sphere, and within each sphere.

The density of the microspheres was measured by mercury displacement and found to be 10.64 g./cc.

EXAMPLE II

This example describes a process for preparing ceria impregnated urania microspheres.

The urania microspheres used for the impregnation were prepared in the same manner as the microspheres described in Example I. They were pretreated in a hydrogen atmosphere to reduce the urania to stoichiometric $UO_2$. A solution was prepared to contain 20 grams of cerium nitrate in 15 ml. of water. The microspheres were then impregnated to incipient wetness with the cerium nitrate solution. The impregnation was carried out using the same equipment and technique as in Example I. The sample was ammoniated by contacting with about 3.5 cc. of concentrated ammonium hydroxide diluted with water in the ratio of 1 to 5. The ammonia was removed by decantation. No precipitate was observed in the ammonia filtrate. The microspheres were dried under an infrared lamp for 5 hours and then washed for 8 hours. After washing, the sample was vacuum dried as in Example I.

The dried microspheres were then sintered using the following cycle. The temperature was increased to 1000° C. slowly in hydrogen atmosphere over a period of 4¼ hours. The temperature was increased to 1400° C. over a period of one hour and held at 1400° to 1485° C. for 1 and ¾ hours. The product was then quenched under hydrogen. There was no evidence of inter-particle sludge accumulation and no small particulate crystals appeared on the surface of the microspheres. The density of the product was 10.7 g./cc. A sample was submitted for cerium analysis and found to contain 1.9 w/o $CeO_2$. A metallographic mount was prepared as in Example I. Examination showed the microspheres to be uniform, fine-grained material in cross section. The microsphere samples were then subjected to X-ray diffraction analysis. The unit cell calculation indicated complete solid solution. The X-ray line widths indicated single phase material. A sample of microspheres was prepared for electron microprobe analysis as in Example I. The cerium content was found to be homogeneous and uniform from sphere to sphere and within each sphere.

EXAMPLE III

This example illustrates the preparation of a thoria impregnated $UO_2$ sphere using an improved washing technique.

The process was exactly the same as described in Examples I and II. In this case, a sample of urania was impregnated with a water solution prepared by dissolving 20 grams of thorium nitrate in 15 ml. of water. The microspheres were impregnated to incipient wetness. The microspheres were then washed by immersion in dry hexanol to remove the water. Hexanol was removed by very gentle vacuum filtration so as not to damage the impregnated microspheres. The sample was ammoniated by contacting the microspheres with concentrated ammonium hydroxide. The sample was then de-watered and washed with water for 8 hours. The washed sample was then vacuum dried as described in Examples I and II. The sample was sintered in hydrogen according to the following cycle. The temperature was slowly raised to 1000° C. over a period of 30 minutes and held at 1400 to 1485° C. for 2 hours. The product was then cooled under hydrogen.

The product was submitted for thorium analysis and found to contain 4.52 w./o. thorium. The product had a density of 10.73.

EXAMPLE IV

A sample of urania microspheres was prepared and pretreated as in Examples I, II and III. The microspheres were impregnated with a solution prepared by dissolving $Gd_2O_3$ in hydrochloric acid. The sample was then treated with ammonium hydroxide, dried with an infrared lamp and washed. The sample was then vacuum dried using the cycle previously described. After drying, the sample was sintered in hydrogen according to the following cycle. The temperature was slowly raised to 1000° C. over a period of 4 hours. The temperature was then increased to 1400° C. in a ½ hour period and held at 1400° C. to 1485° C. for 2 hours. The product was then quenched under hydrogen. The product had a density of 10.76. The sample was submitted for metallographic examination and found to be uniform and fine-grained in cross section. The microsphere samples were then subjected to X-ray diffraction analysis. The unit cell calculation indicated complete solid solution. The sample was then mounted in a special resin, ground to expose a cross section of an imbedded microsphere and polished. The mounted and polished sample was scanned with an electron microprobe beam and the oscilloscope tracing was photographed. As in the case of thoria and ceria, the oscilloscopic tracing confirmed that the gadolinium was uniformly and homogeneously distributed from microsphere to microsphere and within each microsphere.

EXAMPLE V

After having worked out the technique for impregnating microspheres with a fissionable material using the thoria and ceria analogues, a urania microsphere was impregnated with plutonia.

A representative group of pure porous $UO_2$ microspheres (1 gram) was placed in a fritted disc filtration funnel in a glove box. This $UO_2$ microsphere sample was an unsintered microsphere prepared according to process described in U.S. Ser. No. 514,519. The microspheres were pretreated by heating in a hydrogen atmosphere at 500° C. for about 3 hours. A stock plutonium solution about 6 molar in nitric acid was prepared containing approximately 60 grams plutonium per liter. A 2.2 milliliter portion of this stock solution was diluted to 4.4 ml. with deionized water to prepare the impregnation solution. This solution was added dropwise to the $UO_2$ microspheres. The addition was carried out in a glove box in an air atmosphere. The microspheres were constantly agitated during the addition by a flow of argon through the funnel. A total of about 0.44 cc. of solution was required to bring the spheres to incipient wetness.

The spheres were then washed with approximately 30 cc. of dry hexanol to remove the water. The hexanol was removed by vacuum filtration. This process was accomplished very gently so as to prevent harm to the impregnated microspheres.

The sample was then ammoniated by contacting with about 90 cc. concentrated aqueous ammonia. The contact time was 20 minutes. The ammonia was then removed very gently by vacuum filtration. The ammonia wash procedure was repeated several times. No precipitate was observed in the ammonia filtrate. The spheres at this point were whole with no precipitate on the surfaces. The impregnated microspheres were then washed with 500 ml. deionized water over a 4 hour period during which time no physical change in the microspheres were observed.

Following washing, the sample was vacuum dried using the following schedule:

1½ hrs. at 40° C.
1½ hrs. at 60° C.
1½ hrs. at 80° C.
1½ hrs. at 100° C.
1½ hrs. at 120° C.

The microspheres were then cooled under vacuum to room temperature over a 6 hour period at which time the vacuum was broken using air. The spheres still appeared intact to the naked eye.

The microsphere batch was then transferred to a molybdenum tray for final sintering. The sintering atmosphere was a 50–50 volume mixture of hydrogen and nitrogen. The sintering process utilized a horizontal zone furnace which was set up as follows: a 600° C. zone 2 feet long, a transition zone of about 2½ feet, and a high temperature zone at 3,050° F. of about 4 feet. The tray was passed through the furnace at a rate of nine inches per hour. The molydenum tray containing the microspheres traveled through the furnace over a twenty-four hour period. The spheres were at 3,050° F. for a total of about 5 to 6 hours. Microspheres were recovered having good sphericity. There was no evidence of inter-particle sludge accumulation, and no small particulate crystals appeared on the surface of the microspheres.

The density of the product was determined using a xylene pycnometer and found to have an average value of 10.43 g./cc. The microspheres were analyzed for plutonium content. This determination was made by dissolving the microspheres in a mixture of nitric and hydrofluoric acids and adsorbing the solution in an ion exchange resin column. The plutonium was eluted from the column and determined by titration. The microspheres were found to contain 1.2 weight percent plutonium calculated as metal or 1.36 weight percent calculated as $PuO_2$.

EXAMPLE VI

This example illustrates the preparation of a plutonium-uranium carbide microsphere.

In this run, a 1 gram sample of urania-carbon microspheres, prepared according to the process described in U.S. Pat. 3,331,783, was pretreated by heating the urania-carbon microspheres to a temperature of 500° C. for 3 hours in hydrogen. This step removed any excess oxygen and converted the product to a stoichiometric $UO_2$.

A 1 gram sample of these microspheres was placed in a fritted disc filtration funnel in a glove box. A flow of argon was maintained through the funnel to blanket the spheres in an argon atmosphere during the impregnation step. A stock plutonium solution about 6 molar in nitric acid was prepared containing 60 grams of plutonium per liter. Two milliliters of this stock solution was diluted with 2 ml. of deionized water to prepare the impregnation solution. This solution was added dropwise to the microspheres. The microspheres were constantly agitated during the addition. Agitation was provided by a flow of argon through the filtration funnel. A total of about 0.8 cc. of solution was added by a medicine dropper to bring the spheres to incipient wetness.

The spheres were then washed with approximately 30 cc. of dry hexanol to remove water. The hexanol was removed very gently by vacuum filtration so as not to damage the impregnated microspheres.

The sample was then ammoniated by contacting with about 90 cc. concentrated aqueous ammonia. The contact time was 15 minutes. The ammonia was then removed very gently by vacuum filtration. No precipitate was observed in the ammonia filtrate. The spheres at this point were whole with no precipitate on the surfaces. The impregnated microspheres were then washed with deionized water for 4 hours during which time no physical change in the microspheres was observed.

EXAMPLE VII

This example illustrates the impregnation of urania microspheres by an immersion technique wherein the microspheres were immersed in a solution of thorium tetrachloride.

A solution of thorium tetrachloride was prepared to contain 9.53 weight percent thoria ($ThO_2$). The density of the solution was 1.133. A series of runs were completed in which urania microspheres, prepared according to the general process described in U.S. Pat. 3,331,785, were placed in an evaporating dish containing the thoria solution. In runs I and II, 2 grams of the spheres were immersed in 1 cc. of the thoria solution. In runs III and IV, 1 cc. of the thoria solution was diluted with an equal amount of water and 4 grams of urania spheres were then immersed in the diluted solution. In runs V and VI, 1 cc. of the solution was diluted with an equal volume of water and the solution and 2 grams of the $UO_2$ spheres were immersed therein. The spheres were analyzed for the weight percent thoria. The data collected in this series of runs is set out in the table below.

TABLE I

| Run No. | Method of Analysis | w/o Thorium |
|---|---|---|
| I | X-ray spectroscopy | 4.3 |
| II | X-ray diffraction | 6.3 |
| III | X-ray spectroscopy | 1.7 |
| IV | X-ray diffraction | 3.9 |
| V | X-ray spectroscopy | 2.0 |
| VI | X-ray diffraction | 3.9 |

It is apparent from a review of these data that a substantial percentage of thorium can be incorporated into microspheres by the immersion technique.

EXAMPLE VIII

A series of experiments were completed in which $UO_2$ microspheres, prepared by the general technique described in U.S. Pat. 3,331,785, were impregnated with thorium nitrate solution.

A solution of thorium nitrate was made up by dissolving 60 grams of the salt in 300 ml. of water. The resulting solution had a density of 1.344 and contained 9.6 weight percent thoria. The urania microspheres used in this run were pretreated by heating in a hydrogen atmosphere using the technique described in Example V. Six runs were completed to investigate the effect of time and concentration on the amount of impregnant taken up in the microspheres. In each of these runs, one gram of urania microspheres were exposed to 5 cc. volumes of thorium nitrate solution for a period of 2 to 300 minutes. After exposure for the time noted, the thorium nitrate solution was removed by suction filtration. The spheres were then washed in hexanol for 5 minutes to remove the excess water from the surface and the hexanol was removed by suction filtration, then ammoniated by immersion in concentrated ammonium hydroxide for 15 to 20 minutes. The excess ammonia solution was removed by suction filtration. The samples were then washed with water for 8 hours and the water removed by suction filtration. The samples were dried for 7½ hours under vacuum and sintered at 1400° C. for 2 hours under hydrogen atmosphere.

The thoria content of the microspheres was determined by dissolving the microspheres in acid and separating the thoria by oxalic acid precipitation, followed by analysis of the oxalate precipitate to determine the amount of thoria present in each of the spheres. The data collected in this series of runs is set out in the table below:

TABLE II

| Run No. | Volume of thorium nitrate solution (in cc.) | Time of contact with nitrate solution (in min.) | ThO$_2$ content (in wt. percent) |
|---|---|---|---|
| I | 5 | 2 | None |
| II | 5 | 60 | 4.41 |
| III | 5 | 300 | 5.97 |
| IV | (¹) | 2 | None |
| V | 2.5 | 2 | None |

¹ 2.5 cc. solution, 2.5 cc. H$_2$O.

It is obvious from a review of these data that the time of contact and the volume of the thorium solution are very important. The microspheres that were contacted with 5 ml. of the solution for a period of 2 minutes contained no thoria. Increasing the time to 60 and 300 minutes resulted in substantial impregnation with the nitrate solution. Diluting the solution and using 2.5 ml. solution for a period of 2 minutes did not result in any appreciable adsorption of the thoria nitrate solution into the pores of the microspheres.

EXAMPLE IX

This example describes a typical sintering cycle for thoria impregnated urania microspheres where the impregnation was carried out by the immersion technique. Four grams of urania microspheres, prepared by the general technique described in U.S. Pat. 3,331,785, were placed in an evaporating dish and contacted with 2 grams of thorium chloride solution, prepared to contain 9.53 weight percent thoria. The microspheres were in contact with the solution for about 4 to 6 hours. The spheres were removed and sufficient quantity of a 1 to 3 ammonium hydroxide solution was added to cover the microspheres. The spheres were allowed to stand in the ammonia solution for a period of about 16 hours. At the end of this period, the microspheres were removed, washed with water and dried for a period of 7½ hours in a vacuum oven operated at a temperature of 120° C. The microspheres were then placed in a furnace and sintered in an atmosphere of hydrogen. The following sintering cycle was used:

The furnace was raised from room temperature to 500° C. over a period of 1 hour, maintained at 500° C. for 3 hours, raised to 1400° C. over a period of 1 hour and maintained at 1400° C. for 2 hours. The sample was quenched, cooled in hydrogen and submitted for analysis. The microspheres were found to contain 4.9 weight percent thorium by the X-ray spectroscopy technique.

EXAMPLE X

When plutonium is precipitated in the pores of a gel substrate, the skeletal thickness may be thought of as a fertile matrix barrier separating the plutonium precipitated into the pores. On sintering, the plutonium will diffuse through the skeletal wall. We may therefore conclude that, on an average, about one half of the skeletal wall thickness will represent the maximum diffusion path necessary for the plutonium (or other fissionable component) and the fertile matrix material to achieve homogeneous solid solution.

It is quite clear that gel materials having thin skeletons are desirable as impregnation substrates. A series of calculations were made to define these properties of our matrices.

The surface area and pore volumes of a series of thoria sol residues prepared by the electrodialysis technique were measured. In this series, the surface areas varied from 85 square meters per gram to 127 square meters per gram; the pore volumes from 0.11 to 0.13 cubic centimeters per gram.

Using these figures and taking the density of thoria at 10 grams per cubic centimeter, we are able to calculate the specific skeletal volume, that is the volume occupied by the metal oxide comprising the particle framework. We find this value is 0.10 cubic centimeters per gram.

The pore volume is equal to the void space per gram. The specific volume is then equal to:

pore volume plus skeletal volume, or in this case (where the pore volume equals 0.13) to 0.23.

The porosity can be calculated using the formula:

$$\text{Porosity} = \frac{\text{Pore volume (cc./per gram)}}{\text{Total volume (cc./per gram)}}$$

Using the data collected from sols prepared by electrodialysis, we find that, in this case, our microspheres have porosities of: 41 to 57%.

The skeletal thickness ($\theta$) can be calculated, the formulae vary depending on the model used. The cylinder is an often accepted model. The volume (V) of a cylinder can be calculated from the formula:

$$V = \pi r^2 l$$

The surface area (S.A.) can be calculated using the formula:

$$S.A. = 2\pi r l$$

The skeletal thickness ($\theta$) is thus:

$$\frac{\theta}{2} = \frac{\text{Volume}}{\text{Surface Area}}$$

Using the surface area and pore volume data referred to above we found our matrix materials have a skeletal thickness ($\theta$) of from 7.9 A. to 118 A.

A basic characteristic of our materials is a combination of surface area and pore volume which will minimize the diffusion path during the sintering steps. In general, diffusion paths of less than 500 A. are required for homogeneous solid solution formation. Of course, the shorter the diffusion path, the easier the attainment of solid solution. In our process we prefer to use materials with diffusion paths of less than 500 A., preferably less than 100 A.

Our fertile base materials can thus be characterized as having:

Porosities of 10% to 80%.

An average diffusion path of less than 500 A., preferably less than 100 A.

What is claimed is:

1. A process for preparing a mixed urania-plutonia nuclear fuel which comprises contacting unsintered urania microspheres having a pore volume of about 1 to 8 cc./g. with a plutonium salt solution for a period of time sufficient to insure adsorption of the plutonium solution into the interstices in the urania microsphere, converting the adsorbed plutonium salt to a compound selected from the group consisting of hydroxide, carbonate or oxalate, washing, drying, sintering and recovering the fuel as oxide microspheres.

2. The process according to claim 1 wherein the microspheres are contacted with an aqueous solution of plutonium nitrate, chloride or sulfate in a concentration of 0.1 to 700 grams per liter for a period of 1 to 300 mintues.

3. The process according to claim 1 wherein the urania microspheres are contacted with a plutonium salt solution in an organic solvent for a period of 1 to 300 minutes.

4. The process according to claim 1 wherein the organic solvent is selected from the group consisting of acetone, diethyl ether, dibutyl ether, methyl isobutylketone, tributylphosphate, trioctylamine, trilaurylamine and cyclohexyldilaurylamine, and the plutonium is present in an amount equal to 0.1 to 700 grams per liter.

5. The process according to claim 1 wherein the plutonium adsorbed in the microspheres is converted to the hydroxide by contact with a nitrogen containing basic compound, selected from the group consisting of ammonia or amines having less than 10 carbon atoms in the molecule.

6. The process according to claim 5 wherein the plutonium is converted to the hydroxide by contact with a 5 to 30 weight percent ammonium hydroxide solution.

7. The process according to claim 1 wherein the plutonia containing microspheres are washed with an alcohol, dried and sintered.

8. The process according to claim 5 wherein the microspheres are washed with hexanol and dried over a period of about 7 hours, while the temperature is increased from room temperature to 120° C.

9. The process according to claim 5 wherein the dried microspheres are sintered in a reducing atmosphere for a period of about 4 to 6 hours in a cycle where the temperature was increased from 350° C. to 1400° C.

10. The process according to claim 7 wherein the dried microspheres are sintered while being moved through a furnace heated to a temperature of from about 600° F. to 3000° F. over a period of about 24 hours.

References Cited
UNITED STATES PATENTS

| | | | |
|---|---|---|---|
| 3,320,177 | 5/1967 | Halva | 252—301.1 |
| 3,320,178 | 5/1967 | Dewell | 252—301.1 |

CARL D. QUARFORTH, Primary Examiner

S. J. LECHERT, JR., Assistant Examiner

U.S. Cl. X.R.

264—.5